(12) United States Patent
Ko et al.

(10) Patent No.: US 12,455,000 B2
(45) Date of Patent: Oct. 28, 2025

(54) DRIVING UNIT OF STEERING APPARATUS

(71) Applicant: HL MANDO CORPORATION, Pyeongtaek-si (KR)

(72) Inventors: Bong Sung Ko, Yongin-si (KR); Kyeongho Lee, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 800 days.

(21) Appl. No.: 17/736,542

(22) Filed: May 4, 2022

(65) Prior Publication Data

US 2022/0379952 A1 Dec. 1, 2022

(30) Foreign Application Priority Data

May 25, 2021 (KR) .................. 10-2021-0067288

(51) Int. Cl.
*F16H 57/021* (2012.01)
*B62D 5/04* (2006.01)

(52) U.S. Cl.
CPC ......... *F16H 57/021* (2013.01); *B62D 5/0454* (2013.01)

(58) Field of Classification Search
CPC .......... F16H 57/021; F16H 57/0006; F16H 2057/0213; F16H 1/16; B62D 5/0454
See application file for complete search history.

(56) References Cited

U.S. PATENT DOCUMENTS

| | | | |
|---|---|---|---|
| 7,177,744 B2 * | 2/2007 | Tanaka | F16F 1/32 701/41 |
| 2017/0058991 A1 * | 3/2017 | Kim | F16D 3/68 |

FOREIGN PATENT DOCUMENTS

| | | | | |
|---|---|---|---|---|
| CN | 114834521 A | * | 8/2022 | B62D 3/10 |
| KR | 20110076112 A | * | 7/2011 | B62D 7/22 |

OTHER PUBLICATIONS

KR_20110076112_A (Year: 2017).*
CN_114834521_A (Year: 2022).*

* cited by examiner

*Primary Examiner* — Terence Boes
(74) *Attorney, Agent, or Firm* — Hauptman Ham, LLP

(57) ABSTRACT

The present disclosure provides a driving unit of a steering apparatus configured to provide an auxiliary torque of a steering apparatus and including a driving housing having an installation region formed therein, and the driving unit includes a worm shaft disposed in the installation region and having a worm gear formed therein, a first bearing rotatably supporting one side of the worm shaft, a damper penetrating and supporting one side of the worm shaft supported by the first bearing, and a stopper penetrating and supporting one side of the worm shaft passing through the damper, one end of the stopper being spaced apart from the damper so that a movement of the damper is limited in an axial direction of the worm shaft.

7 Claims, 5 Drawing Sheets

DRIVING UNIT OF STEERING APPARATUS

CROSS-REFERENCE TO RELATED APPLICATIONS

This application claims benefit and priority to Korean Patent Application No. 10-2021-0067288, filed on May 25, 2021, with the Korean Intellectual Property Office, the disclosure of which is incorporated herein in its entirety by reference.

TECHNICAL FIELD

An embodiment of the present disclosure relates to a driving unit of a steering apparatus, and more particularly, to a driving unit of a steering apparatus capable of improving durability by preventing excessive compression of a buffer section such as rubber in a damper to reduce noise.

BACKGROUND

In general, when a driver operates a steering wheel, a steering apparatus rotates a wheel. In this case, a driving unit of a steering apparatus provides an auxiliary torque so that a rotation of the wheel is realized smoothly according to the steering wheel operated by the driver. That is, the driving unit of a steering apparatus provides the auxiliary torque to enable a power steering operation.

When a gear is arranged in the driving unit and an external impact is transmitted to the gear, there is a problem that the gear and other gears meshing with the gear may be disengaged, or a bearing supporting rotation may be damaged.

When the bearing is damaged, there is a problem that noise is generated inside the driving unit or a cost is required for replace the bearing. Specifically, in a case where a worm gear is moved in an axial direction when an impact is transmitted in the axial direction of the worm gear, a bearing supporting the rotation of the worm gear and the worm gear may be damaged. Accordingly, there is a problem in that the worm gear receiving power from a driving motor cannot effectively transmit the power provided by the driving motor to a worm wheel meshing with the worm gear.

That is, the power transmitted from the driving motor is transmitted to the worm wheel in a state in which the power transmitted by the driving motor is lost due to damage to the worm gear or bearing. The generated noise may increase auditory fatigue of a driver, and may be transmitted to the outside as the noise of the vehicle itself.

Specifically, when excessive compression of a buffer section in a damper occurs, durability of the damper may be lowered and noise may be generated by the excessive compression.

SUMMARY

An embodiment of the present disclosure provides a driving unit of a steering apparatus capable of preventing a decrease in durability of a damper and reducing damages of a bearing and a worm gear and noise caused by the damages.

According to an aspect of the present disclosure, there is provided a driving unit of a steering apparatus configured to provide an auxiliary torque of a steering apparatus and including a driving housing having an installation region formed therein, the driving unit including: a worm shaft disposed in the installation region and having a worm gear formed therein; a first bearing rotatably supporting one side of the worm shaft; a damper penetrating and supporting one side of the worm shaft supported by the first bearing; and a stopper penetrating and supporting one side of the worm shaft passing through the damper, one end of the stopper being spaced apart from the damper so that a movement of the damper is limited in an axial direction of the worm shaft.

The driving unit may further include a snap ring configured to support the stopper by a driving unit housing.

The driving unit housing may include a snap ring groove formed concavely so that a portion of an outer periphery of the snap ring is inserted and supported.

The damper may be disposed between the bearing and the stopper.

The damper may include a first damper support supporting a side surface of the bearing, and a buffer section disposed between the first damper support part and the stopper to relieve an impact of the worm shaft in the axial direction.

The stopper may include an annular body having a through hole formed therein to penetrate and support a portion of the worm shaft, and a protrusion having one end disposed to be spaced apart from the first damper support and extending from the annular body toward the bearing.

The protrusion may surround a region of an outer peripheral surface of the buffer section, and a plurality of the protrusions may be formed on the annular body.

One region of the protrusion facing an inner peripheral surface of the installation region may have a curved surface.

A length of the protrusion parallel to the axial direction of the worm shaft may be shorter than the length of the buffer section parallel to the axial direction of the worm shaft.

The driving unit may further include: a second bearing rotatably supporting the other side of the worm shaft; and an auxiliary damper disposed between the driving unit housing and the second bearing to cushion an axial impact of the worm gear.

Advantageous Effects

According to embodiments of the present disclosure, the driving unit of a steering apparatus can improve durability by preventing excessive compression of the buffer section in the damper, and effectively reduce noise caused by excessive compression of the buffer section. In addition, according to one embodiment of the present disclosure, the driving unit of a steering apparatus can easily prevent the worm gear, the bearing, and the stopper from being separated to the outside of the driving unit housing.

Moreover, according to one embodiment of the present disclosure, the driving unit of a steering apparatus can effectively prevent separation using the snap ring without the conventional lock nut and machining the cross-section of the driving unit housing for engagement with the conventional lock nut.

DETAILED DESCRIPTION

Hereinafter, with reference to the accompanying drawings, embodiments of the present disclosure will be described in detail so that those of ordinary skill in the art to which the present disclosure pertains can easily implement them. The present disclosure may be embodied in many different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and dimensions are illustrative only and not limiting. Moreover, the same reference numerals are used to indicate like features to the same structural element or part appearing in two or more drawings.

Embodiments of the present disclosure specifically represent ideal embodiments of the present disclosure. As a result, various modifications of the diagram are expected. Therefore, the embodiments are not limited to a specific shape of the illustrated region, and includes, for example, a shape modification by manufacturing.

Hereinafter, a stopper 500 according to one embodiment of the present disclosure will be described with reference to FIGS. 1 to 5.

Figure 1:
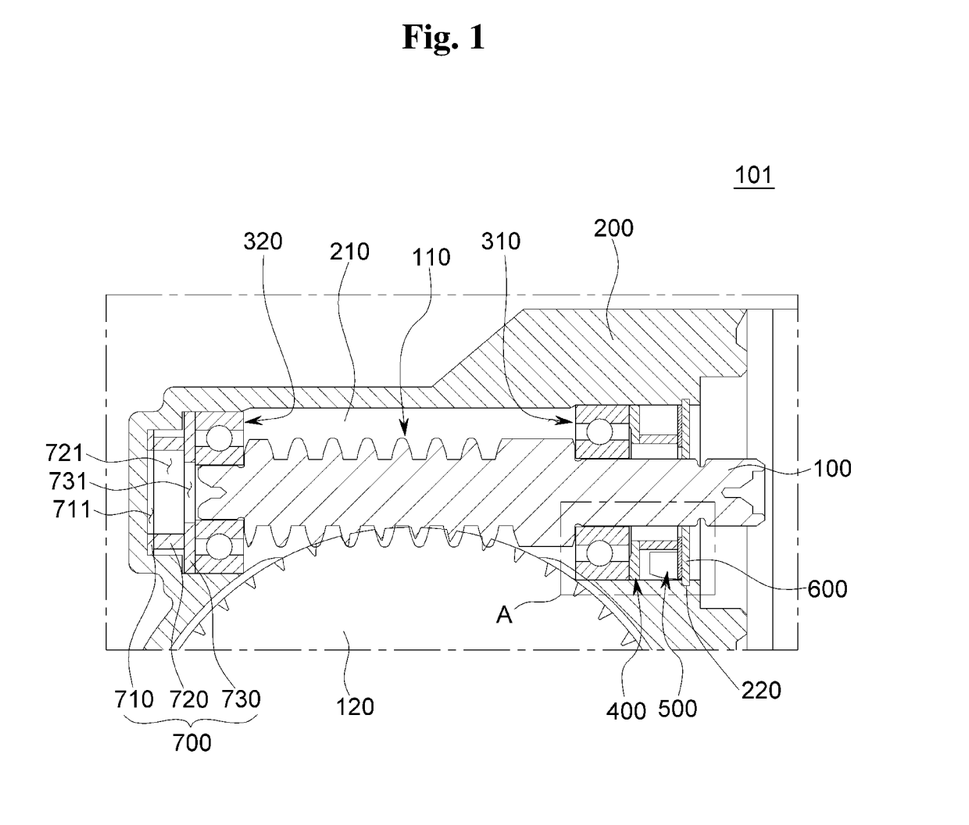
FIG. 1 illustrates a driving unit of a steering apparatus according to one embodiment of the present disclosure.
Figure 2:
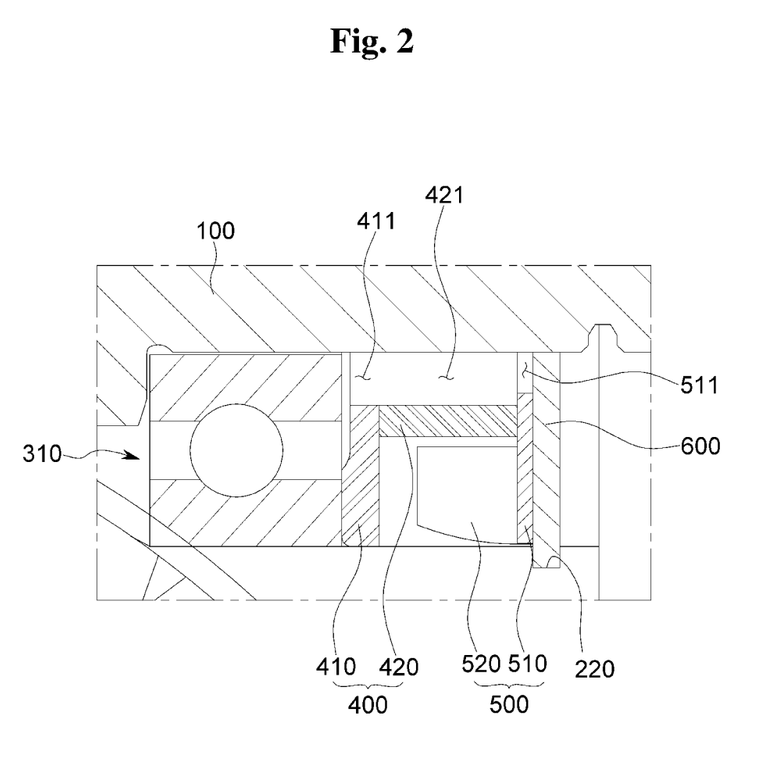
FIG. 2 illustrates an area A of FIG. 1.
Figure 5:
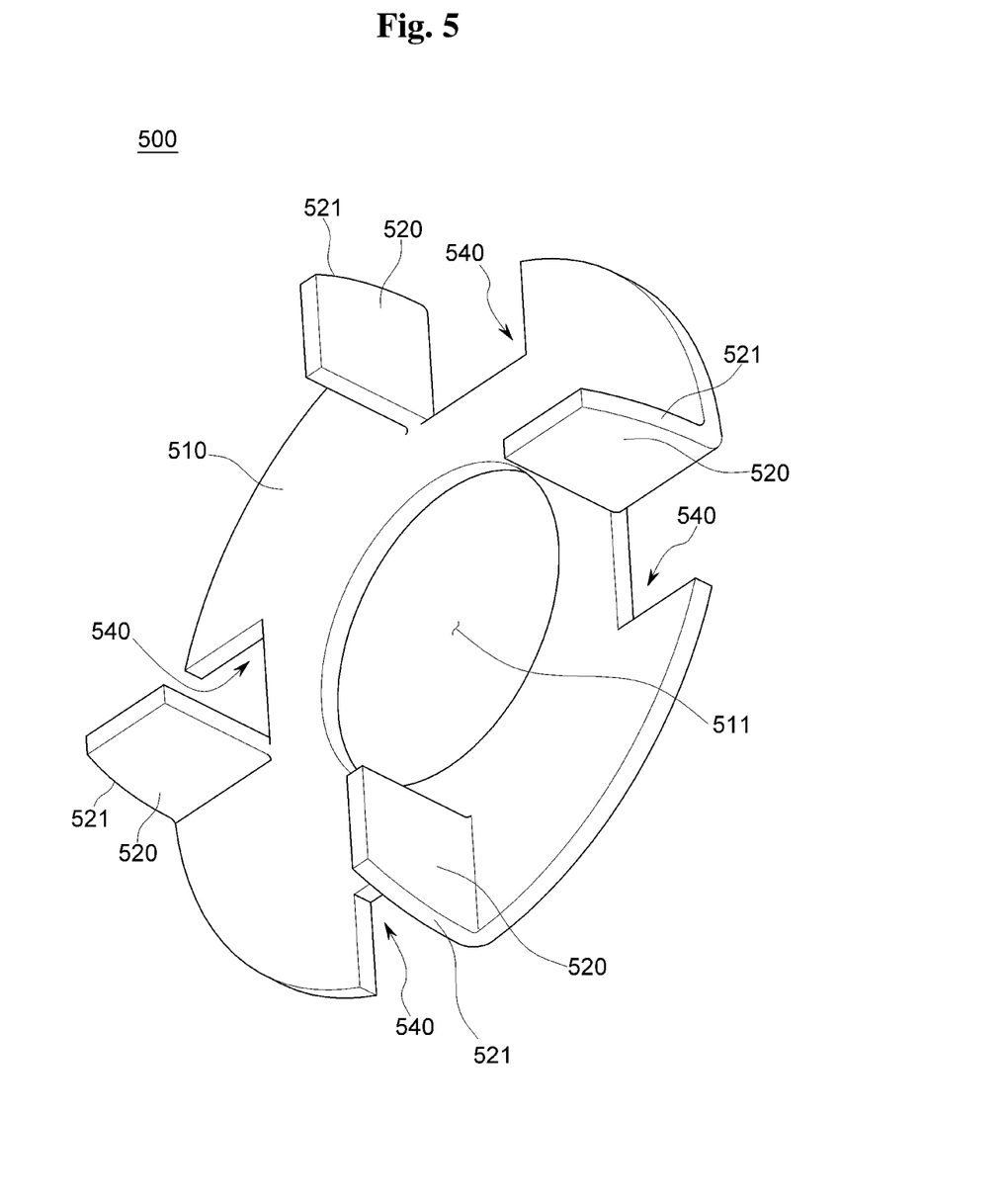
FIG. 5 illustrates a stopper according to one embodiment of the present disclosure.

The stopper 500 is disposed in a driving unit 101 of a steering apparatus as illustrated in FIGS. 1 and 5.

The driving unit 101 of a steering apparatus includes a worm shaft 100 on which a worm gear 110 is formed, a bearing 310 supporting the rotation of the worm shaft 100, and a damper 400 relieving an impact of the bearing 310. Specifically, the driving unit 101 of a steering apparatus provides an auxiliary torque of the steering apparatus so that the wheel rotates smoothly when a driver rotates a steering wheel.

A worm gear 110 is formed on the worm shaft 100, and a worm wheel 120 meshes with the worm gear 110 to provide an auxiliary torque. The worm shaft 100 may be coupled to an electric motor (not illustrated) and rotated to provide power.

The bearing 310 supports the rotation of the worm shaft 100. Specifically, the bearing 310 supports the worm shaft 100 so that the worm shaft 100 is rotatable.

The damper 400 is disposed to be inserted into one side of the worm shaft 100 to prevent an impact from being applied to the bearing 310. The damper 400 may be disposed closer to one end of the worm shaft 100 than the bearing 310. That is, the damper 400 may be disposed so that a distance from the worm gear 110 formed on the worm shaft 100 to the damper 40 is greater than a distance from worm gear 11o to the bearing 310 in an axial direction of the worm shaft 100.

The stopper 500 includes an annular body 510 and a protrusion 520 as illustrated in FIGS. 1 and 5.

The annular body 510 has a through hole 511 formed therein. A portion of the worm shaft 100 is supported through the through hole 511. That is, a part of the worm shaft 100 may be inserted into the through hole 511.

The protrusion 520 is formed on the annular body 510. Moreover, the protrusion 520 may extend from the annular body 510 toward the bearing 310. In addition, one end of the protrusion 520 may be disposed to be spaced apart from the damper 400.

Specifically, one end of the protrusion 520 disposed furthest from the annular body 510 may be disposed spaced apart from the damper 400.

Accordingly, the stopper 500 according to one embodiment of the present disclosure prevents collision with the damper 400 and effectively limits the movements of the bearing 310 and the damper 400 in the axial direction of the worm shaft 100. That is, since the damper 400 and the protrusion 520 are spaced apart from each other, it is possible to effectively prevent noise generated during a collision between the stopper 500 and the damper 400.

In addition, as illustrated in FIG. 5, the protrusion 520 of the stopper 500 according to one embodiment of the present disclosure may be formed by cutting a region of the annular body 510 to be bent.

The protrusion 520 may be formed by cutting a region of the annular body 510. Specifically, a region of the annular body 510 is cut, and one end of the region of the cut annular body 510 is bent in a direction away from the annular body 510 to form the protrusion 520.

As an example, a cut-out portion 540 of one region of the annular body 510 is cut in a shape of about "[" from the outer peripheral portion of the annular body 510, and one end of the cut-out one region of the annular body 510 is bent in a direction parallel to the central axis of the through hole 511. That is, one region of the annular body 510 is cut and formed at about "90°", and thus, the protrusion 520 may be formed.

Accordingly, the protrusion 520 prevents collision with the damper 400 and can be easily manufactured by cutting off a region of the annular body 510 of the stopper 500. Therefore, the protrusion 520 can prevent excessive compression of the damper 400, thereby reducing noise.

In addition, a plurality of protrusions 520 of the stopper 500 according to one embodiment of the present disclosure may be formed in the annular body 510.

The plurality of protrusions 520 may be formed to be spaced apart from each other in the annular body 510. Specifically, the protrusions 520 may be spaced apart from each other in the annular body 510 and bent in the same direction along one circumferential direction of the through hole 511.

For example, the protrusions 520 may be formed to be spaced apart from each other at intervals of 90° on the annular body 510 based on the through hole 511.

Hereinafter, the driving unit 101 of a steering apparatus according to one embodiment of the present disclosure will be described with reference to FIGS. 1 to 5.

As illustrated in FIG. 1, the driving unit 101 of a steering apparatus includes a driving unit housing 200, the worm shaft 100 on which the worm gear 110 is formed, the first bearing 310, the damper 400, and the stopper 500. In addition, the driving unit 101 of a steering apparatus provides an auxiliary torque of the steering apparatus so that steering of the wheel is smoothly controlled by a handle operated by the driver.

An installation region 210 may be formed in the driving unit housing 200. Moreover, the driving unit housing 200 may support an electric motor (not illustrated). Specifically, one side of the installation region 210 is formed to be open so that the bearings, the damper 400, the stopper 500, and the worm shaft 100 are installed.

In the worm shaft 100, a region where the worm gear 110 is formed may be disposed in the installation region 210, and one region where the teeth of the worm gear 110 are formed may be disposed to mesh with an outer peripheral surface of the worm wheel 120 disposed in the driving unit housing 200. Specifically, a central axis of rotation of the worm gear 110 and a central axis of rotation of the worm wheel 120 may be disposed to cross each other. In addition, the worm gear 110 may be coupled to an electric motor (not illustrated) to receive a rotational force. Moreover, the worm shaft 100 may support a region in which the worm gear 110 is formed in the driving unit housing 200. That is, one end of the worm shaft 100 may be connected to the electric motor.

The first bearing 310 may rotatably support one side of the worm shaft 100. Specifically, an inner peripheral surface of the first bearing 310 may support one side of the worm shaft 100, and thus, the first bearing 310 may support the worm shaft 100 so that the worm shaft 100 is rotatable by the meshing of the worm gear 110 and the worm wheel 120 and the electric motor. In addition, one region of the outer peripheral surface of the first bearing 310 may be supported by the inner peripheral surface of the installation region 210 of the driving unit housing 200.

This first bearing 310 may be the same as the above-described bearing 310.

The damper 400 passes through one side of the worm shaft 100 supported by the first bearing 310. In addition, the damper 400 may cushion an axial impact of the worm shaft 100. Specifically, when the axial impact of the worm gear 110 is applied to the damper 400, the damper 400 may cushion the impact caused by the movement of the first bearing 310 and the worm shaft 100. In addition, a portion of the outer peripheral surface of the damper 400 may be in contact with the inner peripheral surface of the driving unit housing 200.

One side of the worm gear 110 passes through the stopper 500. Moreover, the stopper 500 prevents the damper 400 from moving in the axial direction of the worm shaft 100. Specifically, the stopper 500 may limit the movements of the damper 400 and the worm gear 110 in the axial direction of the worm shaft 100 within the installation region 210 of the driving unit housing 200.

Moreover, the stopper 500 is disposed so that one end of the stopper 500 is spaced apart from the damper 400 to limit the movement of the damper 400 in the axial direction of the worm shaft 100.

Accordingly, in the driving unit 101 of a steering apparatus according to one embodiment of the present disclosure, the damper 400 and one end of the stopper 500 are spaced apart from each other to prevent a collision between the damper 400 and the stopper 500. Therefore, it is possible to reduce noise and effectively prevent damage to the first bearing 310 and the damper 400.

In addition, the driving unit 101 of a steering apparatus according to one embodiment of the present disclosure, as illustrated in FIG. 1, may further include a snap ring 600.

The stopper 500 may be supported on the driving unit housing 200 by the snap ring 600. Specifically, the snap ring 600 can prevent the first bearing 310, the damper 400, and the stopper 500 from being moved in the axial direction of the worm shaft 100 and separated to the outside of the driving unit housing 200. That is, the snap ring 600 may be supported in the driving unit housing 200 to prevent the first bearing 310, the damper 400, and the worm shaft 100 from being separated to the open side of the installation region 210 of the driving unit housing 200.

In other words, the snap ring 600 is supported by the driving unit housing 200 to prevent the stopper 500 from being separated in the axial direction of the worm shaft 100 when the worm shaft 100 rotates.

In the installation region 210 of the driving unit housing 200, diameters of the inner peripheral surfaces of the installation region 210 in which the first bearing 310, the damper 400, and the stopper 500 are disposed may be the same.

Accordingly, the driving unit 101 of a steering apparatus of the present disclosure can effectively prevent the stopper 500 and the components by supported the stopper 500 from being separated in the lateral direction of the worm shaft 100 through the snap ring 600 without a complicated configuration.

In addition, the driving unit housing 200 of the driving unit 101 of a steering apparatus according to one embodiment of the present disclosure, as illustrated in FIG. 1, may include a snap ring groove 220.

The snap ring groove 220 may be concavely formed in the driving unit housing 200. A portion of the outer periphery of the snap ring groove 220 may be formed in a ring shape so that the snap ring 600 is inserted and supported. In addition, after an operator assembling the driving unit 101 of a steering apparatus couples the worm shaft 100, the first bearing 310, the damper 400, and the stopper 500, the operator may assemble the snap ring 600 so that the snap ring 600 is coupled to the snap ring groove 220 to be assembled.

Specifically, the snap ring groove 220 may be concavely recessed along the outer periphery direction of the worm shaft 100 in the installation region 210 of the driving unit housing 200. That is, the inner diameter of the snap ring groove 220 may be formed to be larger than the diameter of the inner peripheral surface of the installation region 210 in which the first bearing 310, the damper 400, and the stopper 500 are installed so as to support the snap ring 600.

In addition, the damper 400 of the driving unit 101 of a steering apparatus according to one embodiment of the present disclosure may be disposed between the first bearing 310 and the stopper 500.

The damper 400 may be supported between a side surface of the first bearing 310 and one region of the stopper 500. Specifically, the damper 400 is disposed between the first bearing 310 and the stopper 500, and can effectively cushion the impact applied in the axial direction of the worm shaft 100 from being transmitted to the bearing 310.

In addition, the damper 400 according to one embodiment of the present disclosure may include a first damper support 410 and a buffer section 420 as illustrated in FIGS. 1 to 4.

Figure 4:
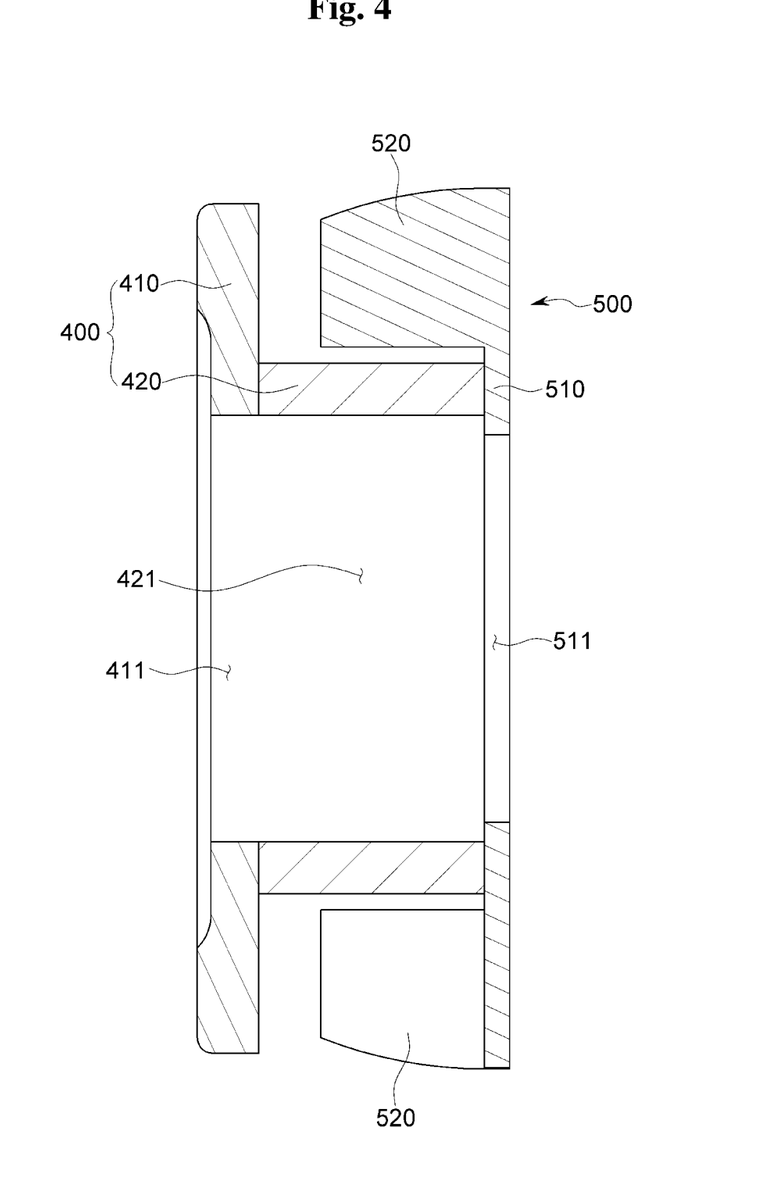
FIG. 4 illustrates a cross section of FIG. 3.

The first damper support 410 is formed in an annular shape, and a damper support through hole 411 through which one side of the worm shaft 100 can pass may be formed in the first damper support 410.

The first damper support 410 may support the side surface of the first bearing 310 as illustrated in FIGS. 1 and 4. Specifically, one surface of the first damper support 410 may support the side surface of the first bearing 310. Moreover, the outer peripheral portion of the first damper support 410 may be supported by the installation region 210.

The buffer section 420 may be disposed between the first damper support 410 and the stopper 500. Specifically, the buffer section 420 is formed in an annular shape and a buffer through hole 511 through which one side of the worm shaft 100 can pass may be formed in the buffer section 420. In addition, the buffer section 420 is formed of an elastic material to be variable in the axial direction of the worm shaft 100, and thus, can absorb the impact.

An outer diameter of the buffer section 420 may be formed smaller than an outer diameter of the first damper support 410.

For example, the first damper support 410 may be formed in a washer type.

Specifically, this buffer section 420 can be prevented from being excessively compressed by the stopper 500. Therefore, durability and lifespan of the damper 400 can be improved by the stopper 500, thereby realizing noise reduction performance.

In addition, as illustrated in FIG. 5, the stopper 500 of the driving unit 101 of a steering apparatus according to one embodiment of the present disclosure may include the annular body 510 and the protrusion 520.

The through hole 511 is formed in the annular body 510 to guide one side of the worm shaft 100 to pass therethrough. The outer peripheral portion of the annular body 510 may be disposed to face the inner peripheral surface of the installation region 210.

The plurality of protrusions 520 may be disposed to be spaced apart from each other on the annular body 510. Moreover, the protrusion 520 may be bent and formed on one surface of the annular body 510. In addition, the other surface of the annular body 510 opposite to one surface of the annular body 510 may be disposed to face the snap ring 600.

The plurality of protrusions 520 limit the axial movement of the worm shaft 100, and as illustrated in FIGS. 1 to 5, effectively prevent a collision between the first bearing 310 and the worm wheel 120. Specifically, when the worm shaft 100 is moved in the axial direction, the first bearing 310 supporting the worm shaft 100 is also moved in the axial direction of the worm shaft 100, and thus, a problem that the worm shaft 100 is engaged with the teeth of the worm wheel 120 and damaged.

In addition, one end of the protrusion 520 may be bent in a direction away from one surface of the annular body 510. That is, one end of the protrusion 520 may be disposed in parallel along the axial direction of the worm shaft 100.

Figure 3:
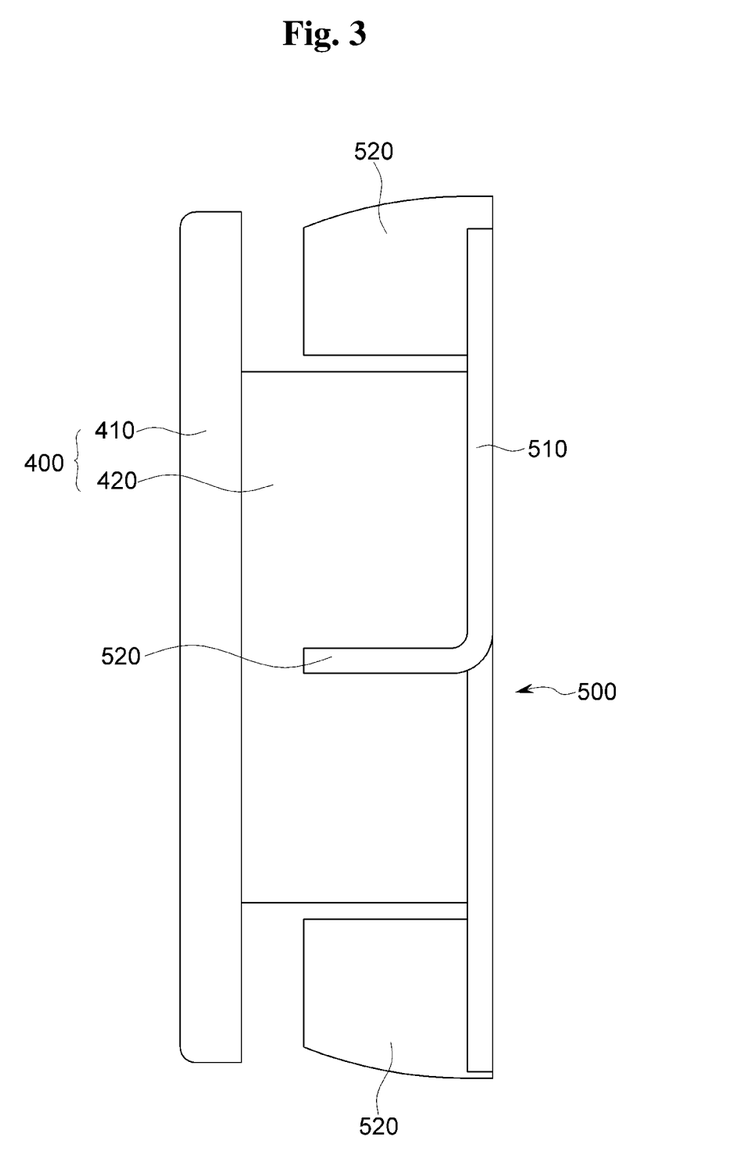
FIG. 3 illustrates a damper and a stopper.

In addition, as illustrated in FIGS. 3 and 4, the protrusion 520 according to one embodiment of the present disclosure may be disposed to surround a region of the outer peripheral surface of the buffer section 420.

One end of the protrusion 520 faces the first damper support 410, and the protrusion 520 between one end of the protrusion 520 and the annular body 510 may be disposed to surround a region of the outer peripheral surface of the buffer section 420. Specifically, the protrusion 520 is spaced apart from the outer peripheral surface of the buffer section 420, but the longitudinal direction of the protrusion 520 may be parallel to the longitudinal direction of the buffer section 420 which is the same as the axial direction of the worm shaft 100.

Therefore, the protrusion 520 is spaced apart from the first damper support 410 and the buffer section 420 and does not come into contact with the damper 400, and thus, it is possible to effectively prevent noise caused by the contact between the first damper support 410 and the buffer section 420 when the buffer section 420 is deformed. Accordingly, the protrusion 520 can improve the lifespan of the damper 400 by limiting the deformation of the buffer section 420.

In addition, as illustrated in FIG. 5, the protrusion 520 according to one embodiment of the present disclosure may further include a curved surface 521.

The curved surface 521 may be formed at the outermost of the protrusions 520. Specifically, the curved surface 521 may be formed in one region facing the inner peripheral surface of the installation region 210. The curved surface 521 may be a surface obtained by cutting off one region of the annular body 510 of the protrusion 520 and bending one region.

That is, the curved surface 521 may be a region of the outer peripheral surface of the annular body 510 before the protrusion 520 is bent.

Accordingly, the curved surface 521 may prevent contact and interference with the inner peripheral surface of the installation region 210, and effectively limit the axial movements of the damper 400 and the worm shaft 100.

In addition, a length of the protrusion 520 according to one embodiment of the present disclosure may be formed to be shorter than a length of the buffer section 420.

The length of the protrusion 520 may be parallel to the axial direction of the worm shaft 100. Specifically, the length of the protrusion 520 may be the height of the protrusion 520 protruding from the annular body 510.

The length of the buffer section 420 may be parallel to the axial direction of the worm shaft 100. Moreover, the length of the buffer section 420 may be parallel to the length of the protrusion 520.

Since the length of the protrusion 520 may be formed to be shorter than the length of the buffer section 420, the protrusion 520 is disposed to surround a region of the outer peripheral surface of the buffer section 420, but one end of the protrusion 520 may be spaced apart from the first damper support 410.

Therefore, the damper 400 and the stopper 500 can effectively prevent noise caused by to collision with each other.

In addition, as illustrated in FIG. 1, the driving unit 101 of a steering apparatus according to one embodiment of the present disclosure may further include a second bearing 320 and an auxiliary damper 700.

The second bearing 320 may be disposed within the driving unit housing 200. In addition, the second bearing 320 may rotatably support the other side of the worm shaft 100. Specifically, the second bearing 320 may be spaced apart from each other along the axial directions of the first bearing 310 and the worm shaft 100.

An outer peripheral surface of the second bearing 320 may be disposed to face the inner side of the driving unit housing 200 to be supported in the driving unit housing 200.

The auxiliary damper 700 may be disposed between the inner surface of the driving unit housing 200 and the second bearing 320. In addition, the auxiliary damper 700 may be such that the impact of the worm gear 110 in the axial direction is cushioned. Specifically, the auxiliary damper 700 effectively prevents the second bearing 320 and the worm shaft 100 from being damaged when the second bearing 320 and the other end of the worm shaft 100 collides with the inside of the driving unit housing 200.

In addition, the auxiliary damper 700 may include a first auxiliary damper support 730, an auxiliary buffer section 720, and a second auxiliary damper support 710.

One surface of the first auxiliary damper support 730 may face the side surface of the second bearing 320 and may support the second bearing 320. In addition, the first auxiliary damper support 730 may be formed in an annular shape, and thus, the first auxiliary damper through hole 731 formed therein may be formed.

For example, the first auxiliary damper support 730 may be a washer type.

The second auxiliary damper support 710 may be supported by the driving unit housing 200. Moreover, an outer diameter of the second auxiliary damper support 710 may be smaller than an outer diameter of the first auxiliary damper support 730.

For example, the second auxiliary damper support 710 may also be a washer type having the second auxiliary damper through hole 711 formed therein.

The auxiliary buffer section 720 may be disposed between the first auxiliary damper support 730 and the second auxiliary damper support 710. In addition, the auxiliary buffer section 720 may have an outer diameter smaller than an outer diameter of the second auxiliary damper support 710. Moreover, the auxiliary buffer section 720 is formed of an elastic material to be variable and can buffer the impact in the axial direction of the worm shaft 100.

An auxiliary through hole 421 may be formed inside the auxiliary buffer section 720.

In addition, since the stopper 500 according to one embodiment of the present disclosure is formed of a plastic material, it is possible to reduce noise generation even when a collision with the damper 400 occurs.

According to the configuration, in the driving unit 101 of a steering apparatus according to one embodiment of the present disclosure, the stopper 500 can prevent the buffer section 420 of the damper 400 from being excessively compressed, and thus, it is possible to increase the durability of the damper 400.

In addition, in the driving unit 101 of a steering apparatus according to one embodiment of the present disclosure, the stopper 500 can reduce the noise caused by the excessive compression of the buffer section 420.

Although the embodiments of the present disclosure have been described above with reference to the accompanying drawings, those skilled in the art to which the present disclosure pertains can understand that the present disclosure may be embodied in other specific forms without changing the technical spirit or essential characteristics thereof.

Therefore, the embodiments described above are to be understood as illustrative and not restrictive in all respects, the scope of the present invention is indicated by the following claims, and the meaning and scope of the claims and all changes or modifications derived from their equivalent concepts should be construed as being included in the scope of the present invention.

DETAILED DESCRIPTION OF MAIN ELEMENTS

101: driving unit of a steering apparatus
100: worm shaft
110: worm gear
120: worm wheel
200: driving unit housing
210: installation region
220: snap ring groove
310: first bearing
320: second bearing
400: damper
410: first damper support
411: damper support through hole
420: buffer section
421: buffer section through hole
500: stopper
510: annular body
511: stopper through hole
520: protrusion
521: curved surface
540: cut-out portion
600: snap ring
700: auxiliary damper

What is claimed is:

1. A driving unit of a steering apparatus configured to provide an auxiliary torque of a steering apparatus and including a driving unit housing having an installation region formed therein, the driving unit comprising:
   a worm shaft disposed in the installation region and having a worm gear formed therein;
   a first bearing rotatably supporting one side of the worm shaft;
   a damper having a damper support through hole into which the one side of the worm shaft supported by the first bearing is inserted; and
   a stopper having a stopper through hole into which the one side of the worm shaft passing through the damper is inserted, one end of the stopper being spaced apart from the damper so that a movement of the damper is limited in an axial direction of the worm shaft,
   wherein the damper includes:
      a first damper support supporting a side surface of the bearing and having the damper support through hole; and
      a buffer section disposed between the first damper support and the stopper to relieve an impact of the worm shaft in the axial direction and having a buffer section through hole into which the one side of the worm shaft is inserted, and
   wherein the stopper includes:
      an annular body formed in an annular shape and having the stopper through hole; and
      a protrusion having one end disposed to be spaced apart from the first damper support and extending from the annular body toward the bearing, wherein the protrusion surrounds a region of an outer peripheral surface of the buffer section, and a plurality of the protrusions are formed on the annular body.

2. The driving unit of claim 1, further comprising a snap ring configured to support the stopper by the driving unit housing.

3. The driving unit of claim 2, wherein the driving unit housing includes a snap ring groove formed concavely so that a portion of an outer periphery of the snap ring is inserted and supported.

4. The driving unit of claim 1, wherein the damper is disposed between the bearing and the stopper.

5. The driving unit of claim 1, wherein one region of the protrusion facing an inner peripheral surface of the installation region has a curved surface.

6. The driving unit of claim 1, wherein a length of the protrusion parallel to the axial direction of the worm shaft is shorter than the length of the buffer section parallel to the axial direction of the worm shaft.

7. The driving unit of claim 1, further comprising:
   a second bearing rotatably supporting an other side of the worm shaft; and
   an auxiliary damper disposed between the driving unit housing and the second bearing to cushion an axial impact of the worm gear.

* * * * *